(12) United States Patent
Roziere et al.

(10) Patent No.: US 9,104,283 B2
(45) Date of Patent: Aug. 11, 2015

(54) CAPACITIVE DETECTION DEVICE WITH ARRANGEMENT OF LINKING TRACKS, AND METHOD IMPLEMENTING SUCH A DEVICE

(71) Applicant: FOGALE NANOTECH, Nimes (FR)

(72) Inventors: Didier Roziere, Nimes (FR); Christophe Blondin, Nimes (FR)

(73) Assignee: FOGALE NANOTECH, Nimes (FR)

( * ) Notice: Subject to any disclaimer, the term of this patent is extended or adjusted under 35 U.S.C. 154(b) by 0 days.

(21) Appl. No.: 14/115,008

(22) PCT Filed: Apr. 16, 2013

(86) PCT No.: PCT/EP2013/057900
§ 371 (c)(1),
(2) Date: Oct. 31, 2013

(87) PCT Pub. No.: WO2013/160151
PCT Pub. Date: Oct. 31, 2013

(65) Prior Publication Data
US 2015/0035792 A1 Feb. 5, 2015

(30) Foreign Application Priority Data

Apr. 25, 2012 (FR) ..................................... 12 53820

(51) Int. Cl.
*G06F 3/045* (2006.01)
*G06F 3/044* (2006.01)
*G06F 3/041* (2006.01)

(52) U.S. Cl.
CPC .............. *G06F 3/044* (2013.01); *G06F 3/0418* (2013.01); *G06F 2203/04104* (2013.01); *G06F 2203/04107* (2013.01); *G06F 2203/04108* (2013.01)

(58) Field of Classification Search
CPC ... G06F 3/0412; G06F 3/044; G06F 3/04107; G06F 3/04111; G06F 3/04112
USPC .................. 345/173, 174; 178/18.06; 349/12
See application file for complete search history.

(56) References Cited

U.S. PATENT DOCUMENTS

| 8,829,926 B2 * | 9/2014 | Zachut et al. ................. 324/658 |
| 2010/0123681 A1 * | 5/2010 | Wu et al. ....................... 345/174 |

(Continued)

FOREIGN PATENT DOCUMENTS

| EP | 2 392 994 | 2/2011 |
| FR | 2756048 | 5/1998 |

(Continued)

*Primary Examiner* — Jimmy H Nguyen
(74) *Attorney, Agent, or Firm* — Greer, Burns & Crain, Ltd.

(57) ABSTRACT

A human-machine interface device is provided having a transparent detection zone and an access zone, and including a surface having electrodes made from a conductive transparent material in the detection zone, conductive connecting tracks arranged in the access zone and connected to the surface having electrodes, a first conductive surface in the transparent zone made from transparent material, and utilized as a guard for the surface having electrodes. The connecting tracks are arranged in a sandwich between a second and a third conductive surfaces utilized as second and third guards for these connecting tracks. Linking tracks are made from a transparent conductive material for linking the connecting tracks to electrodes of the surface having electrodes. The linking tracks are positioned between the electrodes when these linking tracks are situated on the detection surface; and positioned between the second and third guards when these linking tracks are in the access zone.

16 Claims, 7 Drawing Sheets

(56) References Cited

U.S. PATENT DOCUMENTS

| | | |
|---|---|---|
| 2010/0201647 A1 | 8/2010 | Verweg |
| 2011/0216018 A1* | 9/2011 | Kim et al. .................. 345/173 |
| 2011/0234491 A1* | 9/2011 | Nurmi ......................... 345/157 |
| 2012/0008266 A1 | 1/2012 | Nomura |
| 2012/0113038 A1 | 5/2012 | Chen |

FOREIGN PATENT DOCUMENTS

| | | |
|---|---|---|
| WO | 2004/023067 | 3/2004 |
| WO | 2007/060324 | 5/2007 |

* cited by examiner

CAPACITIVE DETECTION DEVICE WITH ARRANGEMENT OF LINKING TRACKS, AND METHOD IMPLEMENTING SUCH A DEVICE

BACKGROUND

The present invention relates to a device for capacitive measurement between an object and a array of electrodes. It finds its application in particular in the general field of 2D capacitive touch surfaces and 3D capacitive detection used for human-machine interface commands.

Increasingly, devices used for communication and for work utilize a touch command interface such as a pad or a screen. There can be mentioned for example mobile phones, smartphones, electronic notebooks, PC, mice, touch screens, widescreens, etc.

A large number of these interfaces utilize capacitive technologies. The touch surface is equipped with conductive electrodes linked to electronic means making it possible to measure the variation of the capacitances created between electrodes and the object to be detected in order to perform a command.

The current capacitive techniques most frequently utilize two layers of conductive electrodes in the form of rows and columns. The electronics measure the coupling capacitances existing between these rows and columns. When a finger is very close to the active surface, the coupling capacitances close to the finger are altered and the electronics can thus locate the 2D position (XY) in the plane of the active surface.

This technology makes it possible to detect the presence and the position of the finger through a dielectric. This technique has the advantage of obtaining a very high resolution on the location in the plane XY of the sensitive surface of one or more fingers. These techniques nevertheless have the drawback of only detecting a contact with the object or detection in very close proximity but not exceeding a few mm. It is difficult to perform touch commands with thick gloves (ski gloves, motorcycle gloves, etc.), with long fingernails or with a stylus. The low sensitivity of the capacitive electrodes does not allow a command to be initiated through a thick dielectric.

It is also impossible to detect the position and the number of fingers holding the portable device in order to deduce the type of hand (left or right) and the possible screening of the screen.

There are also more recent techniques allowing measurement of the absolute capacitance created between the electrodes and the object to be detected. This technique is similar to the techniques known as self-capacitance. There can be mentioned for example patent FR2756048: Floating capacitive measuring bridge, patent FR2893711: Device and Method for Capacitive Measurement by a Floating Bridge, or patent FR2844349: Proximity Detector Comprising Capacitive Sensor. These techniques make it possible to obtain a measurement of the inter electrode-object capacitance with a very high resolution and to detect for example a finger at several cm or even at 10 cm distance. The spatial detection takes place in 3 dimensions XYZ but also by touch within the plane XY. This time it is possible to initiate a command with a glove or through any type of thick dielectric.

These techniques are possible by utilizing therefore an absolute-capacitance measurement electronics in order to be able to detect from the greatest possible distance the position of the object(s) within the space close to the active surface (above and at the periphery of the touch screen). The ideal being to cover the entire surface of the touch screen with capacitive electrodes. These electrodes are linked to an electronic unit in order to convert the capacitance created between each electrode and the object or objects to be detected.

In order to carry out an absolute measurement of these capacitances, it is necessary to eliminate all the parasitic capacitances likely to appear outside the detection zone, i.e. between the electrodes and the electronic circuit such as for example that created by the linking track of each electrode, the underneath of the electrodes, the ribbon cables between the touch screen and the electronics, the input of the electronic circuit, etc.

A large portion of these parasitic capacitances can be suppressed by the use of a guard, the potential of which has substantially the same value as that of the electrodes as described in the patent by Rozière FR2756048.

However, the detection in a volume at a long distance has the drawback of the detection of any object close to the panel but outside its surface. This can limit the possibilities of command or reduce the visible surface of the panel or initiate commands unintentionally.

To this end, it can be provided that the entire surface of the touch screen is only equipped with electrodes without apparent electrical link in order to avoid the surrounding object or objects such as for example the ends of the fingers of the hand holding the portable device being detected as wanted objects.

A solution consists of utilizing a multi-layer capacitive touch screen such as for example a Printed Circuit Board (PCB). The capacitive electrodes are deposited on the outer surface on the side of the object to be detected and all the linking tracks are situated below the electrodes at the level of a lower layer. These tracks are linked to the electrodes using metallized holes via the electrodes layer. All the tracks are connected to the electronics but are guarded until reaching the connection (a guard layer is situated below the linking tracks). Thus, the electrodes guard the tracks by utilizing an electronic unit for example a floating-bridge unit as described in patent FR2756048.

A difficulty however arises for incorporating this function into a telephone, smartphone, GPS, touch screen or any device equipped with this type of touch surface and a screen.

These surfaces of capacitive electrodes must be equipped with transparent electrodes in order to be capable of allowing the light emitted by the display located below the touch screen to pass through. In general, the electrically conductive electrodes are made from Indium Tin Oxide (ITO). This material has good optical and electrical properties. For technical reasons and those involving the manufacturing process and optical quality, it is not possible to use metallized holes and all the capacitive electrodes must be linked to the outer circuit at the sensitive surface using a transparent track only situated on the same layer as these electrodes.

SUMMARY

A subject of the present invention is the optimization of the arrangement of the linking tracks from the electrodes to the capacitive electronics so as to eliminate all the unwanted capacitances in order to obtain a capacitive touch screen capable of detecting the spatial position of one or more objects with a minimum of error.

Another subject of the invention is to introduce new functionalities according to the manner in which a portable device comprising a capacitive detection device is held.

Another subject of the invention is a novel arrangement and/or form of the electrodes for improving object detection.

At least one of said objectives can be achieved with a human-machine interface device having a transparent detection zone and an access zone, this device comprising:

a surface having electrodes made from conductive transparent material in the detection zone, conductive connecting tracks arranged in the access zone and connected to the surface having electrodes, a first conductive surface made from transparent material in the transparent zone, utilized as a guard for the surface having electrodes.

According to the invention, the conductive connecting tracks are arranged at least partially in a sandwich between a second and a third conductive surfaces utilized as second and third guards for these conductive connecting tracks. Moreover, the device according to the invention comprises linking tracks made from a conductive material for linking the conductive connecting tracks to electrodes of the surface having electrodes; when a linking track borders at least one electrode on the detection surface, this linking track is made from a transparent material and positioned between at least two electrodes.

Preferably, when a linking track is situated in the access zone, this linking track is positioned between the second and third guards.

With the device according to the invention, the influence of the linking tracks on the capacitance measurement is reduced. In the detection zone, care is taken that the linking tracks are not located at the end of the rims, they are all implemented between two electrodes. In the access zone, these linking tracks are arranged in a sandwich between guards, i.e. there is a guard below and another above, these two guards preferably having the same potential, particularly by an electrical link between them. Preferably they have the same potential as the first guard, particularly via an electrical link between them. It can therefore be envisaged that at least one of the second and third conductive surfaces is at the same guard potential as the first conductive surface.

The present invention makes it possible to significantly improve the precision (linearity, etc.) of the position measurement of the object or objects in contact with (touch) or in proximity to (hovering) the detection surface which can be a touch screen of a device.

Only the electrodes and the tracks present on the detection surface defined as sensitive can react to the presence of an object. Thus, it is much easier and more robust to carry out a calibration of the touch screen, ignoring any unwanted object such as for example the fingers holding the touch screen.

However, these fingers can be detected with precision using the electrodes because the latter, in particular those located close to the edges of the touch screen, are sensitive to the edge effect. It is therefore possible to determine the object position outside the sensitive surface. The position of the fingers and of the hand (or any other object) holding a portable device (smartphone, remote control, tablet, etc.) can thus be detected. Non-transparent electrodes can also be placed in the access zone.

Preferably, one of the second and third conductive surfaces is a prolongation of the first conductive surface. For example, the first and second guards can constitute a single surface. The first guard can be extended below the access zone using a transparent or non-transparent material.

According to the invention, the electrodes and the guards are designed from tin-doped indium oxide ITO. Other materials transparent to the light such as for example aluminium-doped zinc oxide (AZO) or tin-doped cadmium oxide can also be used.

According to the invention, the electrodes can have different shapes, such as for example:
rectangular,
triangular, or
concave.

According to an advantageous feature, the guards are designed based on a floating-bridge technology. Moreover, the capacitive measurement is preferably of the self-capacitance type, i.e. a measurement of the capacitance created between an electrode and the measurement object.

According to an advantageous feature of the invention, at least one electrode is arranged on the side of the device, outside of the said detection zone. Detection on the edge of the panel can thus serve to perform commands on the side of the portable device such as a smartphone. This electrode can be arranged instead of the third conductive surface acting as a guard.

For example, the sound level of the phone can be adjusted by sliding the thumb over the side of the phone, without the need to use the detection surface directly. This advantage makes it possible to replace the electromechanical buttons often present on one side of the phone.

According to another aspect of the invention, a method is proposed implemented in an apparatus comprising a human-machine interface as defined above. According to the invention, the fingers placed on the edges of the device are detected and the display screen functionalities of the device are modified according to the arrangement of the fingers detected. This makes it possible to organize or lock icons of the display according to the position of the fingers holding a portable device for example. Advantageously, one or more fingers can be used for command on the edge of the touch screen and outside the sensitive surface in order to perform a command.

According to the invention, the number and positioning of the fingers can be determined so as to identify the type of hand holding the apparatus. Thus the left hand or the right hand holding the portable device can be identified. This makes it possible in particular to reposition certain commands on the display screen of the device according to whether a left hand or a right hand is holding the device.

According to the invention, in the absence of detection of fingers on the edges, it is then possible to identify if the apparatus is placed on its support on the side of the sensitive surface or not.

According to the invention, it is possible to use an edge of the device to detect any displacement of an object by means of electrodes of the surface having electrodes so as to initiate commands from within the apparatus. This type of command can correspond to a virtual button replacing for example an electromechanical button placed on the edge of a device (adjustment of the volume, etc.). For example, it can be envisaged that a capacitive command is generated by detecting the displacement of the thumb on the edge without necessarily having electrodes under this thumb. This embodiment corresponds to detection by edge effect.

Another subject of the invention is achieved with a human-machine interface device as described previously or any other human-machine interface device not limited to the features described above but comprising software and hardware means making it possible to detect, for example by means of capacitive electrodes, objects such as fingers for example, on the rim of the device.

This device can comprise a processor unit configured for:
detecting objects on the edges of the upper face of the device, in particular this can be the face comprising a transparent portion making it possible to visualize a display screen,
identifying the exact positioning of these objects, particularly by means of a shape recognition or other algorithm,
commanding a screen display management application so as to alter the display according to the objects detected.

In particular, if the objects are fingers holding the device, and if the display screen comprises icons, these icons can be reorganized according to the positions of the holding fingers. It is possible for example to displace icons which would be at least partially hidden by the fingers. It is therefore possible to alter the position and/or the functionality of certain icons.

It is possible moreover to implement an algorithm in order to distinguish the different fingers and to determine if the left hand or the right hand is involved. It is also possible to identify a thumb. This can be done by analysis of the position of the fingers, their shape (three-dimensional capacitive measurements make it possible in particular to assess the shape of the objects) and their size. The processor unit can be a microprocessor or microcontroller connected to a capacitive electronic detection circuit and controlling software applications of the device or generally of an electronic device such as a mobile phone, tablet or other.

BRIEF DESCRIPTION OF THE DRAWINGS

Other advantages and characteristics of the invention will become apparent on examination of the detailed description of an embodiment which is in no way limitative, and the attached drawings in which.

DETAILED DESCRIPTION

Figure 1A:
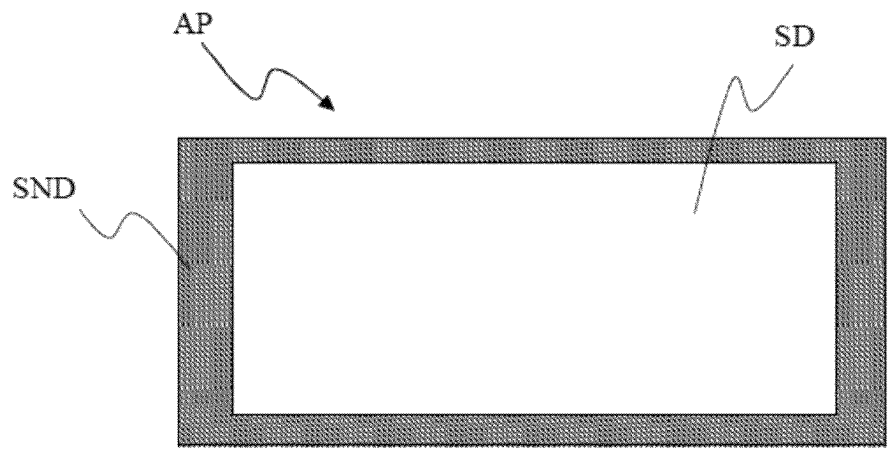
FIGS. 1a and 1b are diagrammatic top views in cross section of a device according to the invention.
Figure 1B:
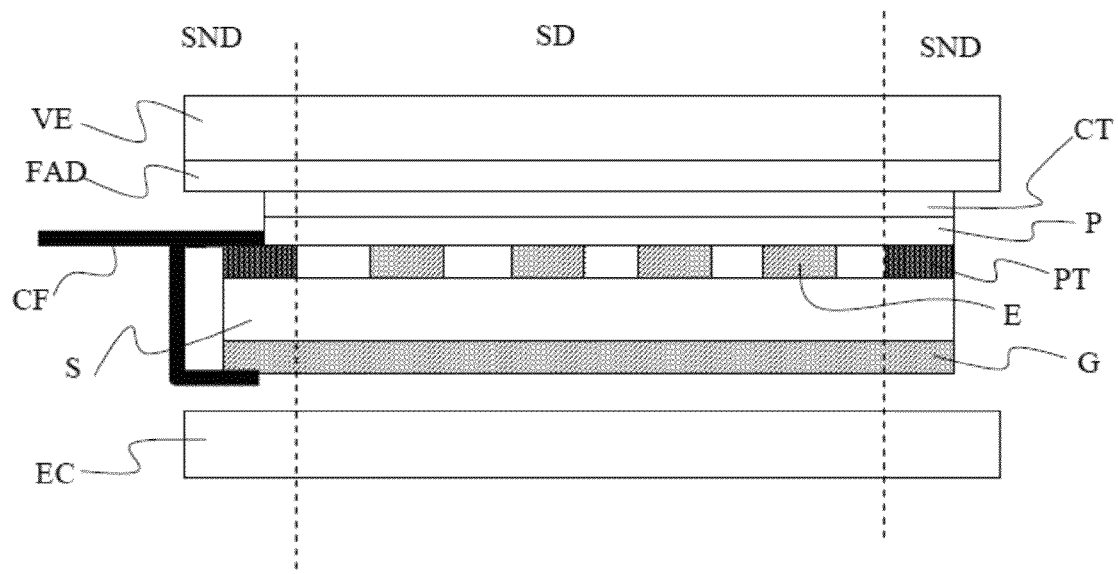

In general terms, FIGS. 1a and 1b show a device AP according to the invention. This can be a phone of the "smartphone" type or a tablet computer equipped with a touch screen, a remote control, a notebook, etc. This device AP comprises a detection surface SD which is the touch portion below which in particular a (flat or curved) array of electrodes is located. This detection surface SD comprises from the upper portion, several layers made from a transparent material such as for example:
- an outer glass VE,
- an anti-debris film FAD,
- a transparent bond CT, and
- a polariser P,
- electrodes E made from conductive transparent material such as tin-doped indium oxide (ITO),
- a support S made from glass, PET or any other dielectric, for electrodes,
- a guard G which is a layer made from conductive transparent material such as tin-doped indium oxide (ITO),
- a display screen EC which must be visible from the outside from the outer glass VE.

The electrodes and the guard are therefore below the detection surface and are made from conductive transparent material which has a high resistivity.

A non-detection surface SND is also distinguished which in the present case surrounds the detection surface SD. This surface is generally opaque from the outside and does not have electrodes but connecting tracks PT and flexible links CF which are made from metal, therefore having low resistivity.

The access zone can be defined here as any zone between the screen and the outer pane corresponding to the non-detection surface.

Figure 2:
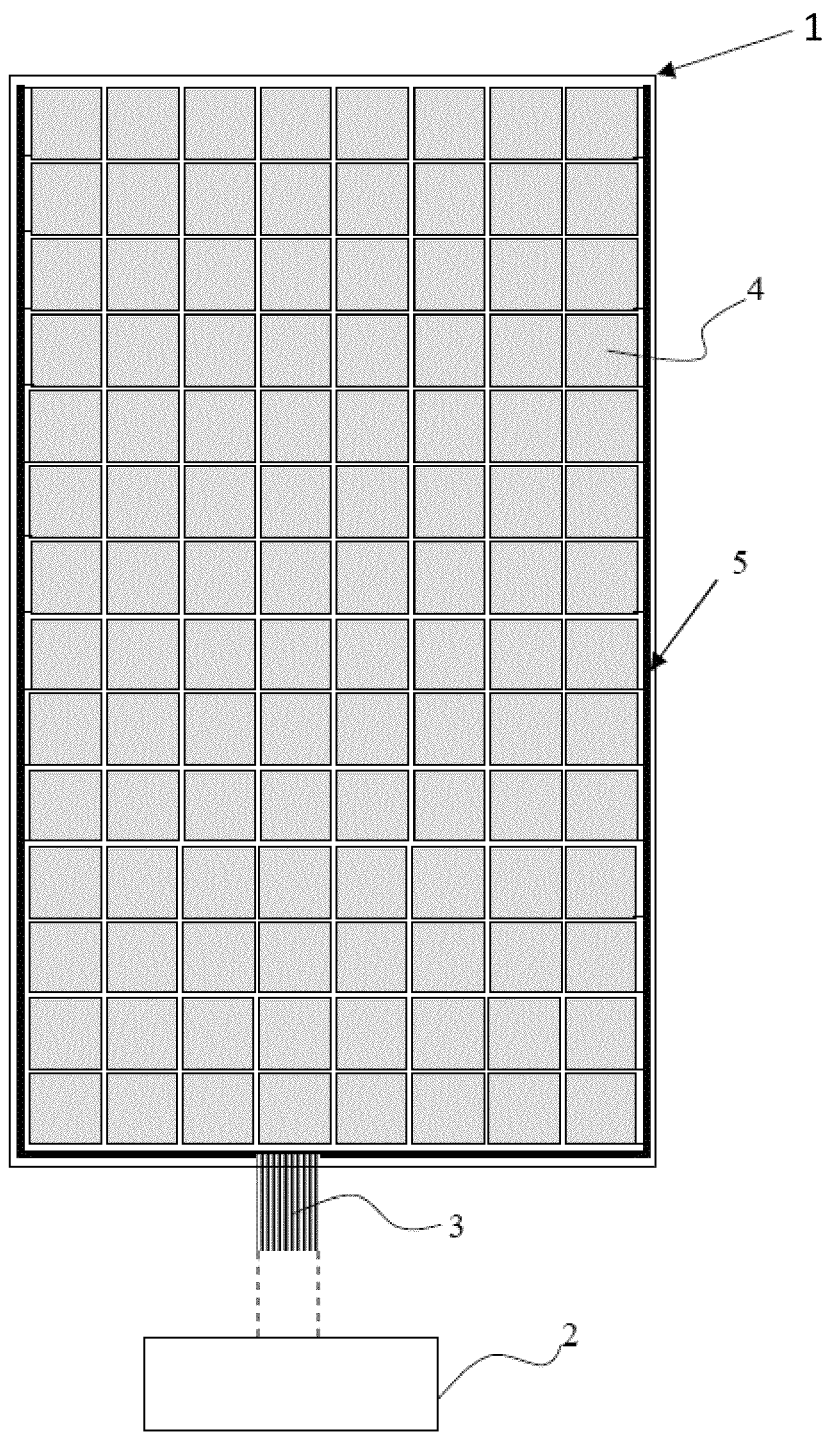
FIG. 2 is a diagrammatic view of a surface having electrodes according to the prior art.

FIG. 2 shows a conventional structure of a transparent touch screen 1 operating with an absolute capacitance electronic measurement unit 2, also known as a self-capacitance unit. A flexible sheet 3 is used for linking the touch screen 1 to the electronic measurement unit which can comprise a microcontroller or microprocessor combined with the software and hardware means necessary for carrying out the absolute capacitance measurement as in the documents of the prior art in particular.

The sensitive surface is equipped with a large number of transparent electrodes 4 made from ITO material which are often but non-limitatively rectangular in shape. Each electrode 4 is linked to a connecting track 5 on the edge of the touch screen. As the edge of the touch screen is outside the display surface, the connecting tracks 5 can be made from metal and not transparent. The advantage of metal is its low electrical resistivity, making it possible to use long edge tracks that are not very bulky (10 to 20 μm wide for example).

Figure 3:
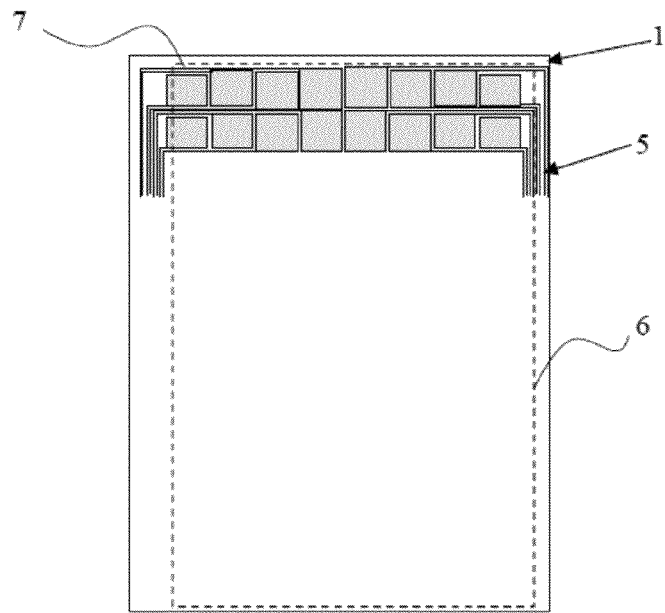
FIG. 3 is a diagrammatic view in slightly more detail of a surface having electrodes having transparent tracks along the electrodes at the end according to the prior art.

FIG. 3 shows an example of a conventional layout of transparent tracks for linking the electrodes on the edge. In the transparent zone 6 also known as the sensitive surface, linking tracks between the electrodes and the connecting tracks 5 are transparent tracks, while the connecting tracks 5 in the access zone (touch screen—the transparent zone) are made from metal.

This figure shows that certain transparent linking tracks 7 are situated on the sensitive surface but outside the electrodes. That is to say that these transparent tracks are located between the last electrodes of the top of the detection surface and the access zone which is generally opaque. This arrangement of tracks increases the failure of detection of the position of an object in these zones. In fact the use of electrodes up to the physical edge of the sensitive surface makes it possible to obtain more efficient signal processing in order to determine the position of an object. The presence of a linking track at the edge of the sensitive surface tends to complicate the signal processing and to degrade the precision of detection of the object.

Figure 4:
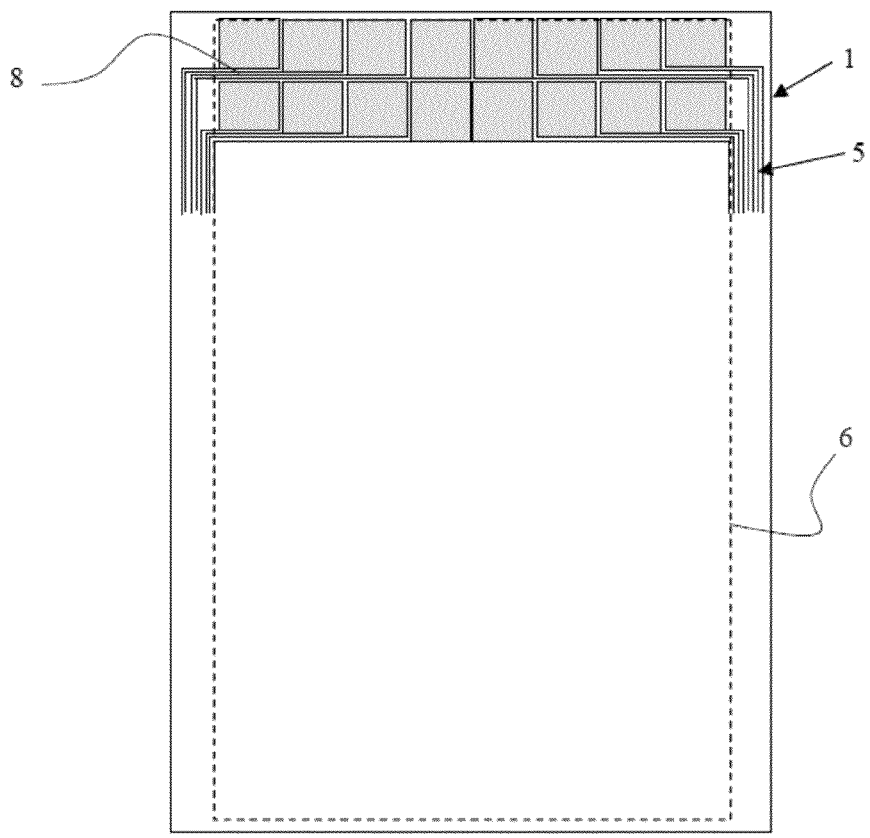
FIG. 4 is a diagrammatic view of a touch screen according to the invention without transparent edge tracks.

FIG. 4 shows a touch screen according to the invention. The transparent edge tracks 7 of FIG. 3 have disappeared, having been displaced inwards as linking tracks 8 between two rows of electrodes. Thus, the electrodes of the last row constitute the border with the access zone around the zone of electrodes.

Figure 5A:
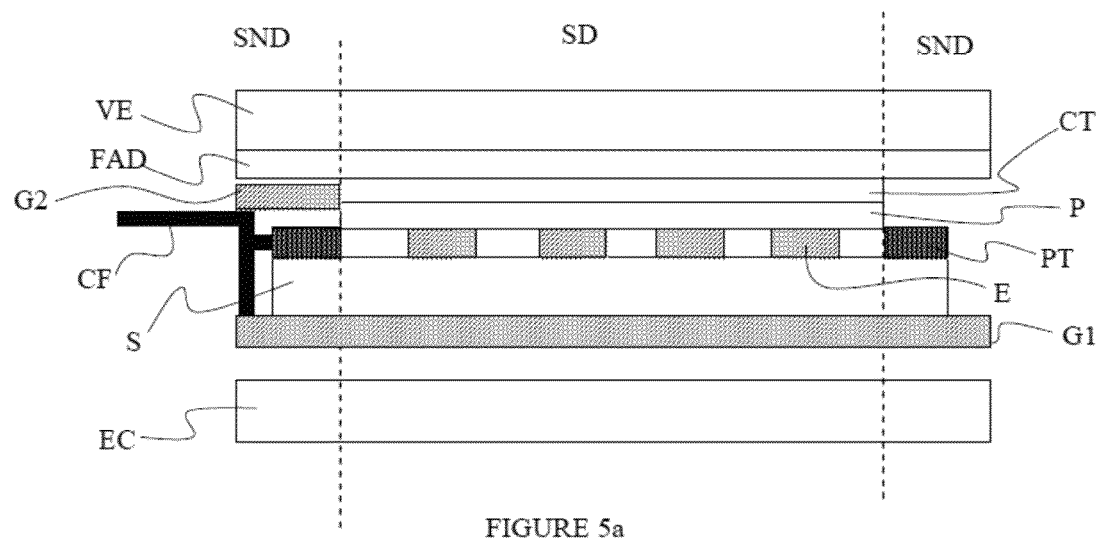
FIG. 5a is a diagrammatic view in cross section of a device according to the invention.

FIG. 5a has the same elements as FIG. 1b, but a new guard G2 is introduced above the connecting tracks PT such that these connecting tracks are placed in a sandwich between the guard G1 (corresponding to the guard G in FIG. 1b) and the guard G2 which are at the same guard potential, particularly linked together electrically. These connecting tracks PT can be covered with a dielectric then with a layer of metal (metal guard) or with the transparent conductive ITO layer (transparent guard) linked to the guard potential by the flexible link CF. Thus these connecting tracks PT cannot create unwanted capacitance measured by the electronics. They cannot react to the presence of an object on the edge of the touch screen as in the example of FIGS. 2 and 3.

In fact, over the whole of the access zone corresponding to the non-detection surface, two guards are provided in order to sandwich all metal and transparent tracks found therein. And in the transparent zone, corresponding to the detection surface, no transparent track is left on the outer edge of the electrodes.

The linking tracks cannot be seen in FIG. 5a.

Figure 5B:
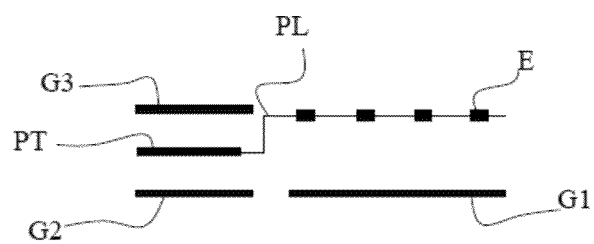
FIG. 5b is a simplified diagrammatic simplified view illustrating the arrangement of linking tracks linking the electrodes to the connecting tracks according to the invention.

On the other hand, FIG. 5b shows an embodiment in which linking tracks PL make it possible to link the conductive connecting tracks PT to electrodes E arranged on a surface having electrodes. The electrodes are transparent and made from ITO material.

The linking tracks PL are transparent when they are in the detection zone corresponding to the detection surface SD. They can be made from metal in the access zone. In the access zone, the connecting tracks PT are arranged, without contact, in a sandwich between a guard G2 below and a guard G3 above. The guards G2 and G3 are preferably made from metal, but can also be made from transparent ITO material. The guard G2 can be an extension of the guard G1 provided for the electrodes E. According to the invention, it is provided to replace the guard G3 (placed above the connecting tracks) by (at least one) measurement electrode(s). In fact, these electrodes like all the others can act as a guard for tracks located below them. These electrodes, arranged on the side of the device can serve mainly for edge detection, i.e. the detection of an object, such as the fingers, placed on the edge of the device.

Figure 6:
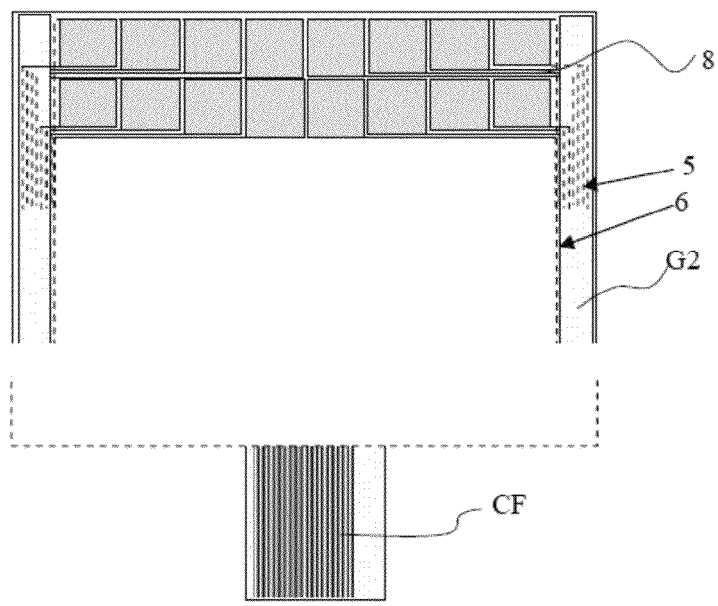
FIG. 6 is a diagrammatic view of a touch screen according to the invention with guards over the access zones.

FIG. 6 shows the general solution in a top view with the metal tracks 5 situated between two guards G1 and G2. Any track on the edges has been dispensed with. Advantageously, the flexible connectors CF are also arranged between G1 and G2. All the transparent tracks 8 in the transparent zone 6 are situated between two rows of electrodes.

According to the invention, it is possible for example to detect the four fingers (at least two fingers) on one side of the device and the thumb on the other side, in order to deduce whether the device is held in the left or the right hand. According to whether this is right- or left-handed, all or some of the touch (icons), gestural or hovering commands can be repositioned in order to optimize the ergonomics.

It is possible for example to correctly position a button (icon) opposite the thumb of the hand holding the device, freeing the icons situated under or too close to the other four fingers in order to facilitate command with the other hand.

Certain commands that are considered too poorly placed with respect to the fingers holding the device can also be deactivated.

The zone the furthest from the fingers holding the device can also be found in order to optimize the scope for hovering. This latter mode is very sensitive to edge effects, and fingers at the edge considerably reduce the scope for hovering.

It is also possible to bring specific commands closer to the four fingers which hold the device in order to add possibilities for command with these fingers.

The capacitive detection of the fingers or any object close to the touch screen can advantageously be done with individual electrodes protected on the screen side by a guard the potential of which is substantially equal to that of the electrodes as the measured capacitances are very low (up to a few fF) and any unwanted parasitic leakage capacitance would degrade the detection.

The electronics manages each electrode so as to measure each inter electrode-object capacitance. The objects detected are referenced at the earth potential of the electronics.

Electrodes can also be placed on the sides of the portable device in order to increase the possibilities of detection of a close object.

The shape of the object can also be detected such as for example a hand so as to know in which direction (front or back) the device is held in the hand.

If the surface is very flat and no presence of an object is detected on the sides, it can be deduced that the device is placed on a flat surface such as a table or placed in a pocket of an item of clothing.

Figure 7:
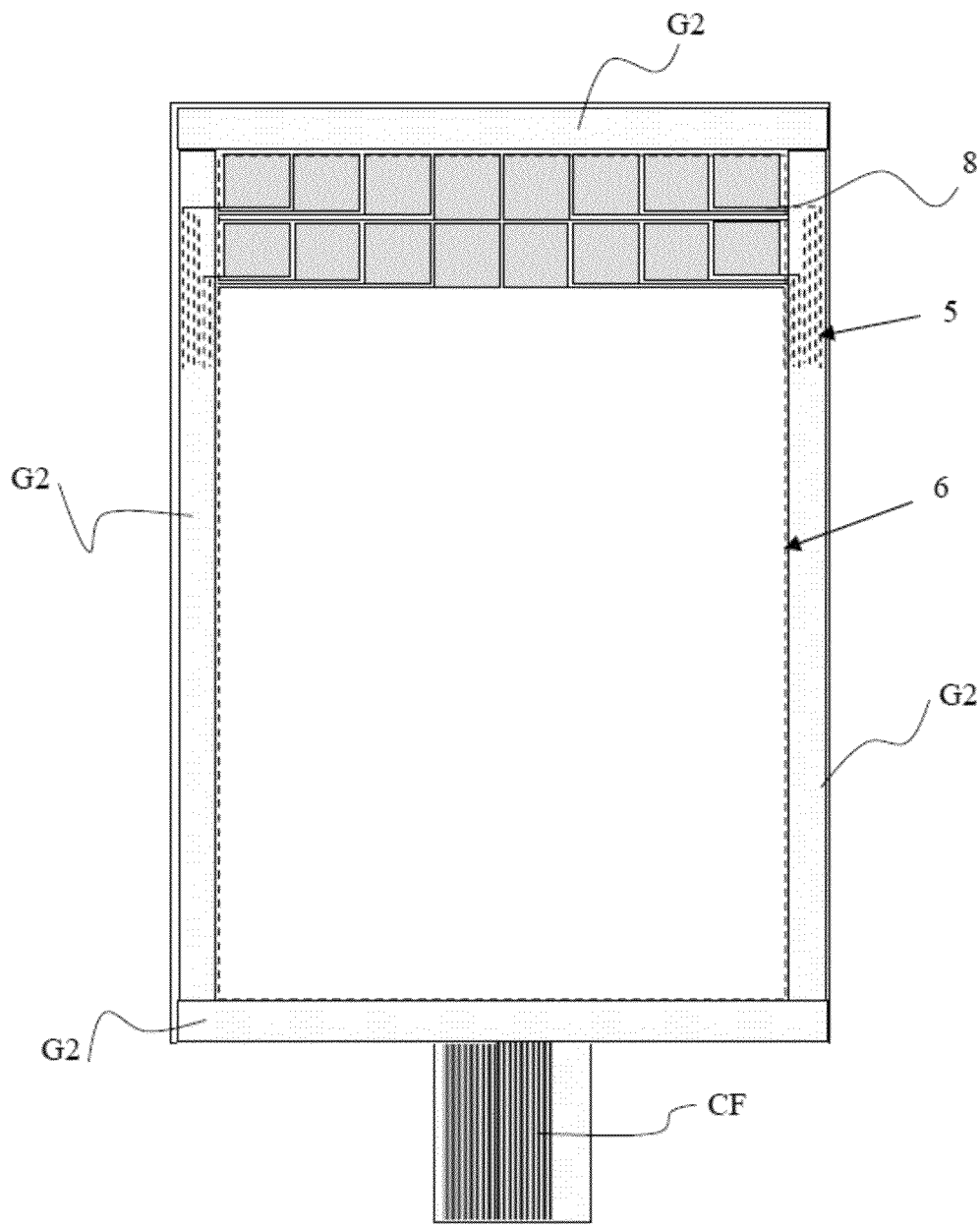
FIG. 7 is a diagrammatic view of a touch screen according to the invention with guards over the whole of the access zone.

FIG. 7 is a diagrammatic front view of a device according to the invention. It is noted that the guard G2 is a frame around the entire transparent surface 6. The guard G1, not shown in FIG. 6, is arranged in a plane parallel to the guard G2 so as to frame metal tracks.

Figure 8:
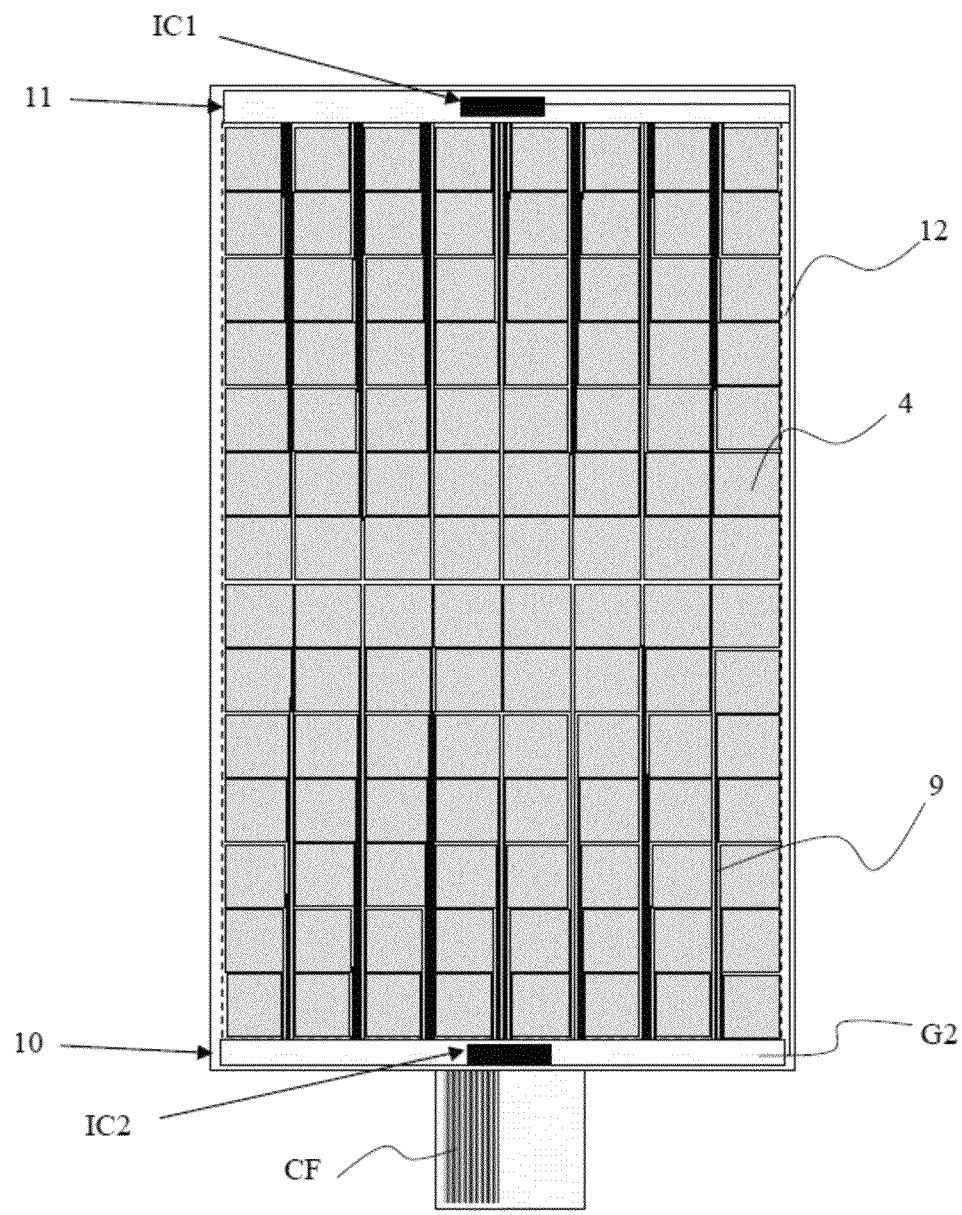
FIG. 8 is a diagrammatic view of a touch screen according to the invention with guards over the short side of the access zone.
Figure 9:
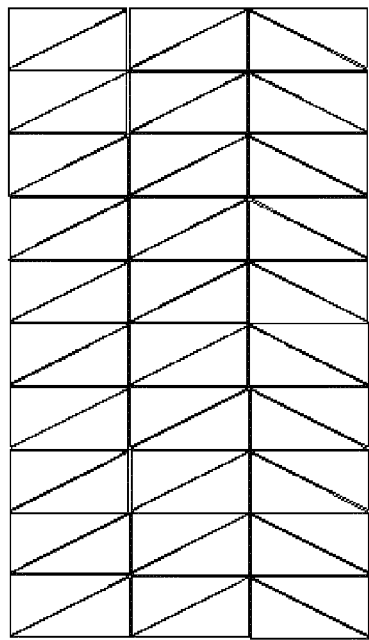
FIGS. 9 to 12 are diagrammatic views illustrating different geometrical forms of electrodes.
Figure 10:
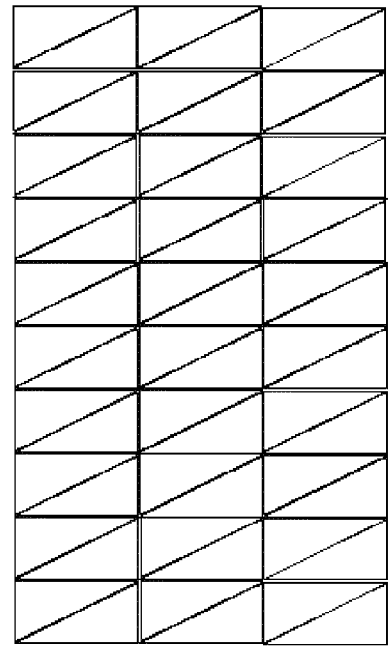
Figure 11:
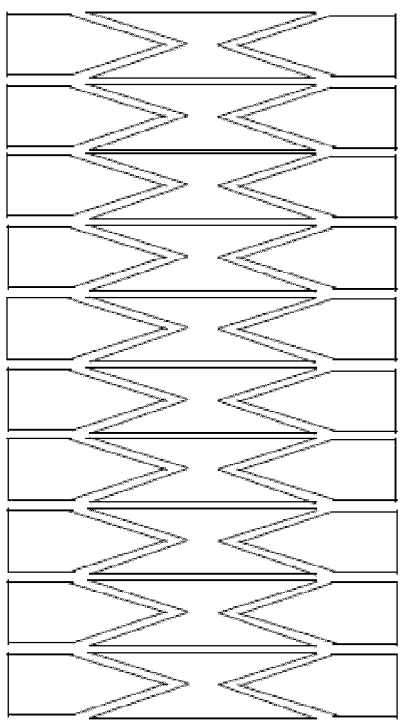
Figure 12:
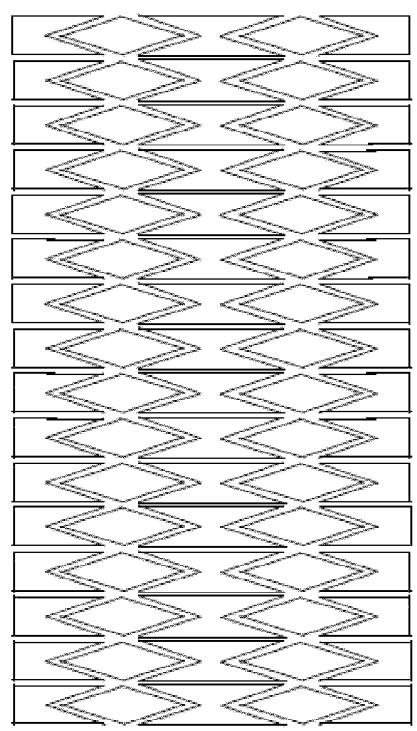

FIG. 8 shows another embodiment of the device according to the invention. In this example, the surface having electrodes is a rectangle for which the linking tracks 9 made from a transparent material link the electrodes from the surface to the access zones 10 and 11 on the short sides of the rectangle. The guards G1 and G2 are arranged in a sandwich in these access zones. In each access zone is an integrated circuit IC1, IC2, connected to the linking tracks originating from the closest electrodes. The tracks between the transparent surface and the integrated circuits can be made from metal.

This solution makes it possible to avoid placing conductive connecting tracks on the long sides that are used for the greater part of the time for holding the device. The advantage is dispensing with the long tracks on the vertical sides. However, a few conductive connecting tracks 12 are used on the vertical sides so that the two integrated circuits can intercommunicate. But these tracks 12 have no need to be guarded. The two integrated circuits can use the same guard potential. The integrated circuit IC2 is then linked to a processing unit via the ribbon cable CF.

The electrodes preferably cover as much as possible of the sensitive surface of the touch screen.

It can be envisaged for the electrodes to have a more complex form than a rectangle, as can be seen in FIGS. 9 to 12.

The use of triangular or concave electrodes can make it possible to reduce their number to the maximum while keeping the same detection performance (precision). It is possible in fact to use triangular shapes in order to add an item of measurement information by using the changing geometry of each electrode with respect to the position of the object.

The interleaved concave electrodes nested together can make it possible to reduce failure by sudden rupture during the passage of an object from one electrode to another or to add information by using the changing geometry of each electrode with respect to the position of the object.

Of course, the invention is not limited to the examples which have just been described and numerous adjustments can be made to these examples without exceeding the scope of the invention.

The invention claimed is:

1. A human-machine interface device having a transparent detection zone and an access zone, said device comprising:
    a surface having electrodes made from a conductive transparent material in the transparent detection zone;
    conductive connecting tracks arranged in the access zone and connected to the surface having electrodes;

linking tracks made from a transparent conductive material for linking the conductive connecting tracks to electrodes of the surface having electrodes;

a first conductive surface made from transparent material in the transparent detection zone, utilized as a guard to eliminate parasitic capacitances for the surface having electrodes;

said conductive connecting tracks are arranged in the access zone in a sandwich between a second and a third conductive surfaces utilized as second and third guards to eliminate parasitic capacitances for said conductive connecting tracks, and the linking tracks are arranged so that when a linking track borders at least one electrode on the transparent detection zone, said linking track is positioned between at least two electrodes, so that all linking tracks in the transparent detection zone are situated between electrodes.

2. The device according to claim 1, wherein when a linking track is situated in the access zone, said linking track is positioned between the second and third guards.

3. The device according to claim 1, wherein at least one of the second and third conductive surfaces is at the same guard potential as the first conductive surface.

4. The device according to claim 1 wherein one of the second and third conductive surfaces is a prolongation of the first conductive surface.

5. The device according to claim 1, wherein the electrodes of the surface having electrodes and the first conductive surface utilized as a guard are designed from tin-doped indium oxide ITO.

6. The device according to claim 1, wherein the electrodes of the surface having electrodes are rectangular in shape.

7. The device according to claim 1, wherein the electrodes of the surface having electrodes are triangular in shape.

8. The device according to claim 1, wherein the electrodes of the surface having electrodes are concave in shape.

9. The device according to claim 1, wherein the first, second and third guards are designed based on a floating-bridge technology.

10. The device according to claim 1, further comprising capacitive measurement electronics of the self-capacitance type.

11. The device according to claim 1, further comprising at least one electrode is arranged on the side of the device outside of the transparent detection zone.

12. The device according to claim 11, wherein said at least one electrode arranged on the side of the device is arranged in the third conductive surface.

13. A method implemented in an apparatus comprising a human-machine interface device as defined in claim 1 with a transparent detection zone superposed to a display screen on a face of said apparatus, comprising: detecting fingers placed on edges of said face and modifying functionalities on the display screen according to an arrangement of said detected fingers.

14. The method according to claim 13, further comprising a number and a positioning of the detected fingers so as to identify a type of hand holding the apparatus.

15. The method according to claim 13, further comprising, in the absence of detection of fingers on the edges, identifying whether the apparatus is placed on a support on a side of the face holding the transparent detection zone.

16. The method according to claim 13, wherein an edge of the apparatus is used for detecting any movement of an object by means of electrodes of the surface having electrodes so as to initiate commands from within the apparatus.

\* \* \* \* \*